(12) United States Patent
Thoreau et al.

(10) Patent No.: US 8,743,958 B2
(45) Date of Patent: Jun. 3, 2014

(54) COMPRESSED VIDEO DATA STREAM SWITCHING METHOD

(75) Inventors: Dominique Thoreau, Cesson Sevigne (FR); Yannick Olivier, Thorigne Fouillard (FR); Franck Hiron, Chateaubourg (FR); Anita Orhand, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1078 days.

(21) Appl. No.: 12/316,248

(22) Filed: Dec. 10, 2008

(65) Prior Publication Data

US 2009/0154561 A1      Jun. 18, 2009

(30) Foreign Application Priority Data

Dec. 14, 2007    (FR) ..................... 07 08750

(51) Int. Cl.
*H04N 7/12*     (2006.01)
*H04N 11/02*    (2006.01)
*H04N 11/04*    (2006.01)

(52) U.S. Cl.
USPC ............ 375/240.15; 375/240.12; 375/240.01; 375/240.26

(58) Field of Classification Search
USPC .............. 375/240.15, 240.12, 240.01, 240.26
See application file for complete search history.

(56) References Cited

U.S. PATENT DOCUMENTS

| 6,275,618 | B1 | 8/2001 | Kodama |
| 6,393,057 | B1 * | 5/2002 | Thoreau et al. ............... 375/240 |
| 6,823,010 | B1 * | 11/2004 | Curet et al. ............. 375/240.12 |
| 7,113,542 | B2 * | 9/2006 | Tanaka ..................... 375/240.01 |
| 2003/0206596 | A1 | 11/2003 | Carver et al. |

FOREIGN PATENT DOCUMENTS

| EP | 0982948 | 3/2000 |
| FR | 2784845 | 4/2000 |
| JP | 11004448 | 1/1999 |
| JP | 2007116604 | 5/2007 |
| WO | WO2006/022664 | 3/2006 |

OTHER PUBLICATIONS

Mathias Wien: Variable Block-Size Transforms for Hybrid Video Coding (online) Feb. 3, 2004, p. 1-176, XP002481661.
Brightwell P. J. et al. "Flexible switching and editing of MPEG-2 video bitstreams" Broadcasting Convention, 1997. IBS 97., International (Conf. Publ. 447) Amsterdam, Netherlands Sep. 12-16, 1997, London, UK. IEE, UK, Sep. 12, 1997. pp. 547-552 XP006508814.
Search report dated May 28, 2008.

* cited by examiner

*Primary Examiner* — Geepy Pe
(74) *Attorney, Agent, or Firm* — Myers Wolin LLC

(57) ABSTRACT

According to the compressed video data stream switching method for the transmission of a first data stream corresponding to a first video sequence, followed by, in a given switching point of this first stream, a second data stream corresponding to a second video sequence, the second data stream is modified prior to transmission, by a replacement of the bidirectional pictures with bidirectional commutation pictures of which the pictures blocks have a null residue and a null motion vector which is either forward or backward, according to the position of the blocks in the picture.

9 Claims, 2 Drawing Sheets

COMPRESSED VIDEO DATA STREAM SWITCHING METHOD

This application claims the benefit, under 35 U.S.C. §119 of EP Patent Application 0708750 filed 14 Dec. 2007.

FIELD OF THE INVENTION

The invention relates to a compressed video data stream switching method, making use of, in particular, intra, predictive and bidirectional types of coding.

For example it concerns the switching of video sequences or programme segments that are coded according to the Mpeg4-avc standard, an acronym for the English expression Motion Picture Expert Group, Advance Video Coding.

Encoding according to the Mpeg4-avc standard calls upon different types of picture coding:

Intra coding (Picture 1) that does not refer to any prior or subsequent picture, Predictive type inter coding (picture P) that is able to call upon a previous reference picture Bidirectional type inter coding (Picture B) that is able to call upon a previous reference picture and/or a following reference picture.

Pictures, according to the Mpeg standard, are grouped in GOP or groups of pictures. The first picture of a GOP is an intra type picture and the first type B pictures that follow can call upon pictures of the same GOP, it is a closed GOP, or pictures from the same GOP or of the previous GOP, then it is an open GOP.

DESCRIPTION OF THE PRIOR ART

Today films or video sequences are stored in a compressed form, in order to reduce the memory capacities that are required. The switching of sequences is therefore not done in base band but directly from Mpeg coded data streams.

Let us consider for example a broadcast of two successive video sequences, from digital data stored in a compressed form, a first compressed video data stream corresponding to a first sequence of pictures called former stream which is replaced, from a point called the switching point, by a second compressed video data stream called new stream and corresponding to a second sequence of pictures. The problem arises when the data stream arriving at the switching point starts with an open GOP. Indeed, the decoding of the compressed pictures of a first GOP of this second stream can require, if we are dealing with an open GOP, the use of pictures of a previous GOP. The previous GOP corresponding to a data stream of another sequence, the decoded pictures corresponding to this open GOP will show faults. These faults are generally very visible and are due to the use, for the decoding of these first type B pictures of the second sequence, of a different reference picture to that used for the coding. Effectively the picture blocks making up the picture or the open GOP pictures coded in bidirectional mode are picture blocks coded in inter from a type P or I reference picture of the previous GOP for the same picture sequence. The decoding of the blocks coded in inter, blocks made up of residue information or prediction errors, for the first bidirectional type pictures after the switching point exploits different blocks to those which were used to calculate those residue blocks coded in inter. The reference picture taken into account at the decoding level is different to that taken into account at the coding level.

Very cumbersome blocks effects consisting in the visualisation of erroneous picture blocks will appear on the first pictures of the second sequence.

A solution to this problem does exist and is known for being described in part 1 of the Mpeg2 standard, document ISO/IEC 13818-1 annex K. It involves the integration, in the system layer, of information regarding possible switching points, called splicing points in the standard, for which the transport stream has favourable characteristics, enabling the decoding of pictures without the faults mentioned above, for example by using closed GOPs. The switching will then only be able to done at one these points. Of course, this information must be incorporated in the data stream as from the picture coding and it is no longer possible to incorporate it subsequently without implementing a new decompression and compression of the data.

An authorised switching point, at the start of a GOP, adds a constraint on the coding of the first pictures of this GOP, coded in bidirectional mode, as this GOP has to be closed. These pictures can only use, as reference pictures, following pictures and no longer previous pictures, they are therefore forced in monodirectional mode. This compatible Mpeg2 coding of the stream switchings therefore reduces the compression rate and is not usually used for the coding of films or video sequences. Today, there are very few products on the market that force closed GOPs for switching requirements, for the constraints induced to regulate the rate at the coder level prove cumbersome. On the other hand, determining beforehand whereabouts in the data stream a closed GOP must be used, that is to say to predetermine the points in the sequence where there will be breaks, assumes that one knows the future usages of the sequences. Otherwise, it would be necessary to exclusively use closed GOPs.

This solution therefore has numerous disadvantages:

A reduction in the video data compression rate.

The need to decode and recode the data streams which do not have this stream switching compatibility at the basis, and all of the problems linked to restoring the data, picture quality . . . .

One known solution consists in recoding the intermediate commutation pictures, by replacing them with pictures coded in intra mode. This solution requires a recoding of the data stream of the pictures in question. Another known solution is to code the intermediate commutation pictures by replacing them with predefined pictures, for example by a coding in intra of a black picture. The major disadvantage of this method lies in the cumbersome visual yield of the switching.

SUMMARY OF THE INVENTION

The invention aims at the abovementioned disadvantages.

It relates to a compressed video data stream switching method for the transmission of a first data stream corresponding to a first video sequence followed, in a given switching point of this first stream, by a second data stream corresponding to a second video sequence, each sequence being coded according to a GOP (Group of Pictures) structure, each GOP comprising intra type pictures that coded in intra, predictive type coded in inter and bidirectional type coded in inter, characterised in that the second data stream is modified prior to its transmission, by replacing bidirectional type pictures, pictures following the intra picture of the first GOP of the second sequence following the switching point, when one considers the coding order of the pictures, by bidirectional pictures, called commutation pictures, in which picture blocks have a null residue and a null motion vector that is forward or backward according to the position of the blocks in picture. According to a particular implementation, for the position of a block, the motion vector attributed also depends on the temporal position of the commutation picture to which it belongs in relation to the reference pictures. According to a particular implementation, the picture block is a macroblock or a sub-partition of a macroblock.

According to a particular means of implementation, the forward or backward vector is defined by an index relative to the reference pictures, attributed to the macroblock or sub-partition.

According to a particular implementation, the number of blocks of a commutation picture in backward prediction increases from one picture to another when the temporal location of the picture considered gets closer to the following reference picture.

According to a particular implementation, the picture blocks are weighted with regard to the predictions regarding the reference pictures and the weighting rate is related to the temporary location of the commutation picture in relation to the reference pictures.

According to a particular implementation, the weighting rates are predetermined per slice of macroblocks and the picture is divided into slices according to the positions of the macroblocks for which the same weighting rates are chosen.

According to a particular implementation, the method exploits the FMO tool (Flexible Macroblock Ordering) to define the slices.

According to a particular implementation, the position of a block for a forward or backward prediction is defined, for a picture, according to the following steps:
  the attribution of a random number between 0 and 1 for each of the picture blocks,
  the attribution of a threshold to each commutation picture, this threshold increasing when the picture considered temporally moves towards the following reference picture,
  the selection, for a picture, of blocks of a number superior to the threshold attributed to the picture.

According to a particular implementation, the Nb first macroblocks, according to a TV type scan, of a type B current picture, use a backward motion vector, Nb being defined by:

$$N_b = N_{MB} * \alpha * b$$

$N_{MB}$ being the number of macroblocks per picture
$\alpha = 1/M$, M being the period of P pictures
b being the index of the position, 1, 2, 3, ..., of the current B type picture in the interval of the I or P prediction pictures, with 0<b<M.

The method consists in replacing the initial type B transition pictures with type B compressed pictures corresponding to patterns defined beforehand. These patterns call upon more or less complex sets of the prediction/compensation tools, backward motion vectors, forward motion vectors and of weighting. Once the pictures are created, it is then sufficient to substitute the thereby pre-encoded B type pictures to the initial transition B type pictures, that is to say located after the first I picture of the second sequence, when considering the coding order.

The main advantage of the invention is to enable a switching of a video sequence onto another sequence or the insertion of a video sequence in another sequence whilst minimising the faults that can appear during the switching operations or several switching operations. Thanks to this invention, it is possible to make use of Mpeg coded data streams of the stream switching that are not compatible, GOPs open, and therefore of the compressed video sequences in an optimum manner.

By replacing B commutation pictures by B pictures equipped with prediction modes, motion vectors and pre-defined weighting, the switch can operate correctly, that is to say without switching artefact, possibly with a yield similar to basic special effects. The sequence transitions are also smoothed by deleting the most cumbersome picture faults generated by the open GOPS at the start of a new data stream.

The replacement of pictures in the data stream, at the server level for example, can be done, for a given format, from the same predefined pictures. The implementation cost is low due to the fact that the structure of the transport stream (according to the Mpeg standard) is not modified by the processing, avoiding complex depacketisation and repacketisation operations.

BRIEF DESCRIPTION OF THE DRAWINGS

Other special features and advantages of the invention will be clearly shown in the following description aimed at providing non-limitative examples, and elaborated in the light of the appended figures which represent.

DETAILED DESCRIPTION OF THE PREFERRED EMBODIMENTS

Figure 1:
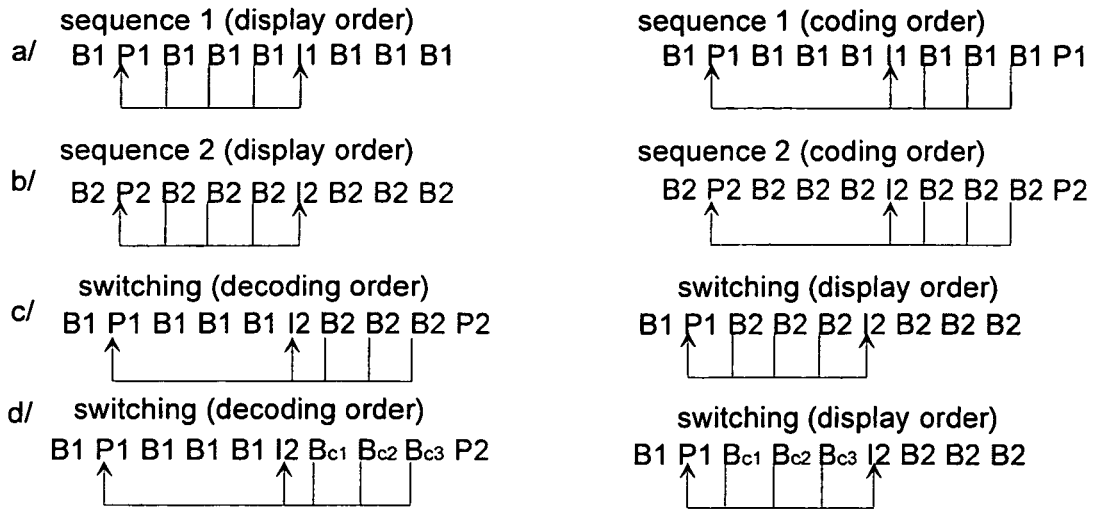
FIG. 1, a stream switching between two bitstreams,
  FIG. 2, examples of transition at the picture level,
  FIG. 3, an example of a vertical left-right transition at the level of a sequence.

FIG. 1 illustrates the switching principle, during a video transmission, of a video sequence called sequence 1 towards a second video sequence called sequence 2.

The video sequences used are sequences coded according to the Mpeg standard. The coding order or coded order of the pictures, which is also the order in which the pictures are transmitted at the output of the coder and/or the order in which the pictures at the input of a coder are decoded and memorised is different from the display order of these decoded pictures, due to the possibilities of bidirectional coding.

Let us assume that the two sequences 1 and 2 are made up of type I, B, and P pictures, whose coding order is the following:
  sequence 1
  B1 P1** B1 B1 B1 I1 B1* B1* B1* P1
  sequence 2
  B2 P2** B2 B2 B2 I2 B2* B2* B2* P2

The intra type picture (I1, I2) defines the border of a new GOP.

The three bidirectional type pictures following the intra type picture, pictures marked with an asterisk, can refer to the intra type picture and the type P picture preceding this intra picture, picture marked with two asterisks, therefore belonging to the previous GOP. This choice of the reference is made at the level of the macroblock. The coding of an overall picture can therefore call simultaneously upon two references, the intra type picture and the type P picture.

The switching at the GOP level gives the new transmitted sequence made up of the sequence 1 up to the border of the GOP, then of the sequence 2:
  Switched sequence
  B1 P1**B1 B1 B1 I2 B2*B2*B2*P2

The three bidirectional type B2* pictures following the intra type picture will make reference to, during the decoding, to intra type I2 picture and predictive type P1** picture.

Accordingly, the three pictures can't be correctly decoded, as they have lost one of their reference pictures (P2 replaced by P1).

Let us now consider the two coded picture sequences in the display order, that is to say after reordering for the display.
sequence 1
B1 P1**B1* B1* B1* I1 B1 B1 B1 . . . .
sequence 2
B2 P2** B2* B2* B2* I2 B2 B2 B2 . . . .
switched sequence
B1 P1**B2*B2*B2*I2 B2 B2 B2 . . . .

The decoding of the three bidirectional type B2 pictures exploits different reference pictures to those used during the coding. This difference in the reference pictures is the source of the visualisation faults in the B2 pictures*.

The coding method according to the invention consists in replacing the B2 pictures corresponding to the coding of a prediction residue error in relation to one or more of the reference pictures, by pictures that have a predetermined configuration, in a such a manner that the erroneous prediction information contained in the blocks of these type B pictures are independent of the reference pictures used during the decoding.

On FIG. 1, the bitstreams are represented according to the display order and the coding/decoding order:
In a) are represented the stream of the first sequence according to the visualisation order and the display order, then according to the coding order, the arrows indicating the dependence in terms of references of B pictures,
In (b) the pictures of the second sequence,
In (c) a new bitstream made up of a part of the first sequence and a part of the second sequence,
In (d) the same illustration as in (c), showing those pictures called B, which are pictures upon which the method is applied enabling to avoid switching artefacts.

A first method consists of a progressive type switching at the level of the sequence, called picture based, based on picture type weighted predictions. A second method consists of a progressive type switching at the level of the picture, called block based, based on special effects at the level of the macroblocks of the picture.

The picture based progressive type switch can exploit the implicit or explicit weighting, in the context of the Mpeg4-avc standard.

Subsequently, the various mentioned 'headers' and header fields refer to the Mpeg4-avc standard and are defined in the document ISO/MEC 14496-10.

The implicit weighting tool is, for example, used to carry out a cross fading. To implement a cross fading between the two sequences via the B transition pictures, a total of three in our example, a solution consists of encoding each of the B pictures according to the following steps:
indicating in the header of the B picture that this picture uses the so called implicit weighting. This information can more precisely be found in the Picture Parameter Set (PPS) field in the slice header and relates to all the macroblocks of a slice. It is therefore necessary to insert a PPS dedicated to the cross fading.
encoding each macroblock (MB), of a luminance size equivalent to 16×16 pixels, in bidirectional mode where each forward or backward motion vector corresponds to the null vector.
encoding no prediction residue, that is to say to consider these null value residues, so that the decoding as such corresponds to the prediction searched to carry out the cross fading.

The $B_c$ pictures refer to the I2 picture but also to the P1 picture. When the I2 picture is not a classic intra picture but an IDR type intra picture, meaning that the reference pictures that precede this IDR picture have not been kept, that is to say that the P1 picture has been deleted from the list of reference pictures, a conversion of the I(DR)2 picture in I2 picture is carried out, for example by modifying the header so that the decoder does not empty the reference picture from its buffer.

By so doing, each of the B pictures, so coded, create a progressive transition from sequence 1 to sequence 2, according to a mix of the reference pictures, P1 and I2 shown on FIG. 1d, that is dependent on the position of the $B_{ci}$ picture, considered in the time frame (P1, I2), according to the display order.

On the basis of M-1 B transition pictures, the weighting is carried out in the following manner, for a MB macroblock of the indexed B picture, according to the display order, between a previous picture of reference $P_{prev}$ and a following picture of reference $I_{next}$:

$$MB_{ci}{}^B = (P_{prev}(x_{for}, y_{for}))*(1-\alpha*b) + I_{next}(x_{back}, y_{back})*\alpha*b),$$

with
M: period of the P pictures,
$\alpha = 1/M$
b: position index, 1, 2, 3, . . . , of the current B type picture in the interval of the I or P prediction pictures, such as: 0<b<M.

The couple ($\alpha$, b) corresponds to the principle of implicit weighting $P_{prev}(x_{for}, y_{for})$ corresponds to the macroblock in the previous reference picture, display order, pointed by the forward motion vector of $x_{for}$ and $y_{for}$, component of the current macroblock.

$I_{next}(x_{back}, y_{back})$ corresponds to the macroblock in the following reference picture, display order, pointed by the backward motion vector of $x_{back}$ and $y_{back}$ components of the current macroblock.

As an example, if M=4, the prediction of a macroblock belonging to the B picture of index b=3, B picture preceding $I_{next}$, operates in the following manner:

$$MB_{c3}{}^B = (P_{prev}(x_{for}, y_{for}))*0.25 + I_{next}(x_{back}, y_{back})*0.75),$$

A superior weighting is therefore applied to the picture $I_{next}$ that allows to carry out the cross fading.

For example, the explicit weighting tool is exploited to carry out the fading.

In the header of the picture, weighted prediction field, is specified the value of the weighting factor associated to each of the reference pictures. In the present example, the explicit weighting is used to operate the transition by a black fading then reverse fading towards the new sequence. This method requires a certain number of B pictures, this configuration can be found during the use not only of B pictures but of type B reference pictures called B stored in the Mpeg4-avc standard, these pictures serving as reference pictures. The idea here is make the first half of the B pictures, those of classic B type, carry out a transition to black, the second half making the progressive transition towards the content of the I picture of the second sequence. The method is as follows:
the first half of the transition pictures are encoded as either type B or type P pictures, in which the MB macroblocks are in forward prediction with a null vector and of null residue, the explicit weighting being equal to, $\alpha$, such as:

$$MB_{cb}{}^B = (P_{prev}(x_{for}, y_{for}))*(1-\alpha*b)),$$

with

M: period of P pictures,

α=2/M b: position index (1, 2, 3, ...) of the current B type picture in the time frame of the I or P prediction pictures, such as, 0<b<M.

the second half of the transition pictures, are encoded as type B pictures, in which the MB macroblocks are in backward prediction with a null vector and of null residue, the explicit weighting still being equal to α, such as:

$$MB_{cb}^B = (I_{next}(x_{back}, y_{back}))*(\alpha*b-1)),$$

A variant consists in coding the central picture in Bstored in black, the remaining B pictures being therefore coded in B with implicit weighting, the pictures of the first part making reference to the past reference picture and the Bstored picture, the other B pictures relying on the Bstored picture and the reference picture of the new sequence.

The previous solutions allow a picture based transition; indeed, all of the macroblocks of a B transition picture are coded in the same way. The block based switching, described below, enables, by playing on the vectors and in particular upon the index of the reference pictures of each of the macroblocks upon which the vectors are pointed, of a null value, to carry out original and progressive spatio-temporal transitions.

Figure 2:
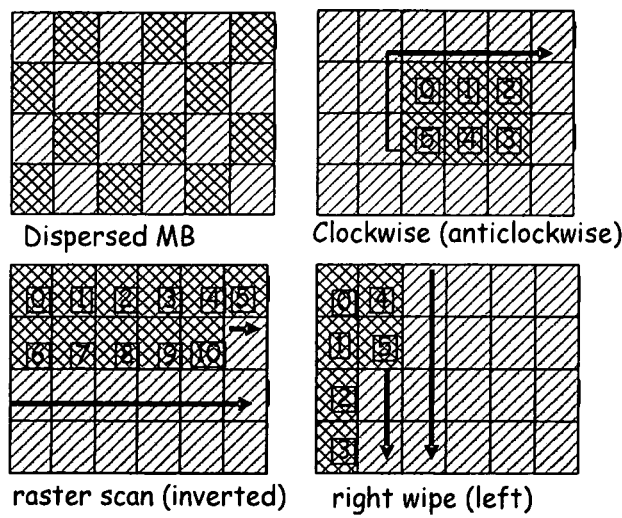

FIG. 2 gives examples of such transitions. These examples of special effects are of course not exhaustive.

FIG. 2a corresponds to a transition by dispersed macroblocks, FIG. 2b to a progressive transition from the centre to the exterior of the picture, FIG. 2c to a progressive linear transition from the top of the picture and FIG. 2d to a transition in columns from the left of the picture. The numbers attributed to the macroblocks correspond to the appearance order on the pictures. The displacement directions can of course be reversed.

This type of transition is carried out by pointing, via a backward motion vector, successively in time, the macroblocks towards the future reference picture, that is to say the I picture, the macroblocks still pointing towards the P picture of the previous sequence.

Here the bidirectional commutation pictures have forward prediction and backward prediction modes that are predefined by attributing to picture blocks a null motion vector, a residue of zero value and a weighting rate relative to predictions regarding one or several reference pictures that is a function of the position of the blocks in the picture.

An implementation example relating to the raster scan, FIG. 2c, is described hereafter:

M is the period of the P pictures,

α=1/M, b is the index of position, 1, 2, 3, ..., of the current B type picture in the interval of the I or P prediction pictures, with 0<b<M.

The $N_b$ number of macroblocks of the B picture of b index pointing on the future reference picture is equal to:

$N_b = N_{MB}*\alpha*b$ with $N_{MB}$ the number of macroblocks per picture.

More precisely it is the $N_b$ first macroblocks of the B picture, according to the classic coding order of a picture by macroblock, that is to say the order of the TV scan, that point onto the future reference picture, with the aid of a backward motion vector of null amplitude, the remaining macroblocks of the picture then pointing onto the past reference picture, these are forward motion vectors, still on the basis of a null vector.

Another example consists in a transition by dispersed macroblocks, FIG. 2a. It implies, for example, a random dispersed repartition, obtained by attributing in a first fashion a random number comprised between 0 and 1 to each of the macroblocks composing the format of the picture, at the rate of a same number for the temporarily co-located macroblocks of all the pictures concerned, then to consider that any macroblock of a rank B picture whose random number is superior to the α*b value is going to point towards the future reference picture, the other macroblocks still making reference to the past index picture. Actually, these thresholds are designed to define the percentage of macroblocks pointing in the following reference picture, ¼; ½ then ¾ for b respectively equal to 1, 2 et 3, where M=4.

Figure 3:
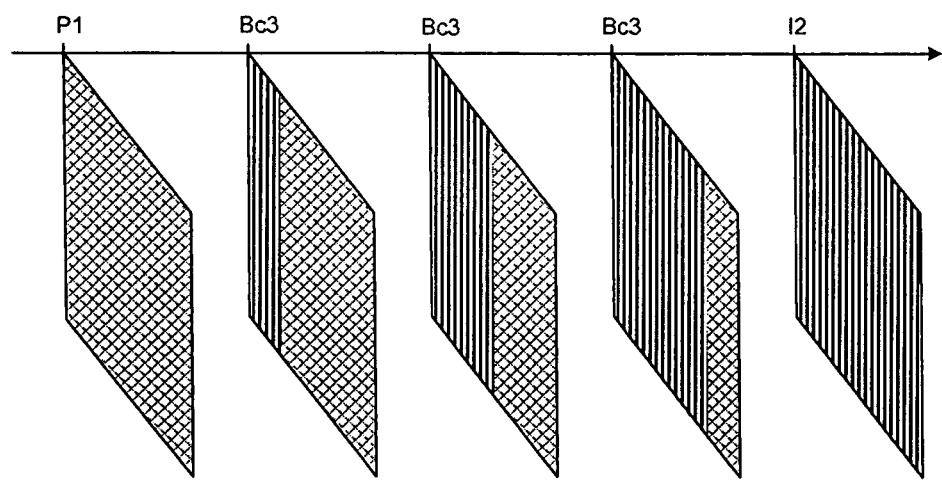

FIG. 3 represents an example of a left to right switching in the case of three B type pictures, the first B picture including ¼ of the macroblocks pointing on the future I reference picture and ¾ of the macroblocks pointing on the P picture, the macroblocks of the second B picture being spread out by half and the third B picture including ¼ of the macroblocks pointing on the P picture and ¾ of those pointing on the I picture.

With regard to the coding mode of the macroblocks of the B pictures, or even P for certain configurations, the forward and backward bidirectional modes have been used with a view to clarifying the description and understanding the method. Some variants can prove more effective in terms of coding cost across the modes known as "Direct mode", specific to Mpeg4-avc, of B pictures, modes that allow dealing with either forward, backward prediction or bidirectional prediction. Moreover, these Direct modes achieve, according certain conditions, a mode called Skip mode, in which the macroblock coding cost is almost null, a mode which, in this application, is very likely to be used since the residues coding cost is voluntarily set to zero.

The description was made from a motion field resolution returned to the entity of the macroblock for which it was attributed either a forward vector or a backward vector or both vectors in bidirectional mode. This choice has enabled a simple description to be made. In fact, the macroblock can be sliced into sub-partitions of luminance sized 8×16, 16×8, 8×8, 4×8 8×4 and 4×4 pixels. Amongst these sub-partitions, those sized 8×16, 16×8 et 8×8 can have vectors that point on reference pictures of different indexes. The method applied to macroblocks can therefore easily be extended up to the 8×8 sub-partitions of these macroblocks. It is therefore possible to obtain a thinner spatial resolution in the yield of the special effects, very worthy for circular and spiral type effects.

A combination of the method based upon weighted prediction fading and cross fading, and of that based on the special effects represents a variant of this switching technique. We must then take into account, for the weighting of the intermediate B pictures with regard to the reference pictures, not only the number of macroblocks in the picture but also their luminance. It is therefore possible to combine, to the special effects—or more exactly the spatial yields described for the B pictures, an implicit weighting, a bidirectional prediction or an explicit weighting, a forward prediction (list $l_0$) or a backward prediction (list $l_1$) for the blocks which are not concerned with the fading.

The implicit or explicit weightings can only be decided at the level of a slice of macroblocks. The tool contained in the H 264 standard, FMO, standing for Flexible Macroblock Ordering can be exploited, enabling the slices of macroblocks to be structured with regard to the blocks in question and therefore to reduce these constraints, therefore increasing the possible effects. If in the case of a raster scan, FIG. 2c, the picture can easily be decomposed into four slices without using the FMO tool, the same does not go with the left to right column scan.

This proposition relating to pictures in progressive scan is also applicable to pictures in interlaced scan, notably taking into account the temporal index of the frame considered in the temporal referential (P1, I2) illustrated FIG. 1.

It is possible, remaining in the domain of the invention, to extend the application, that is to say the replacement of pictures, to a more important sequential duration, for example from previous type I or P pictures of the first stream up to a first type I picture of the second stream, so as to enable a less elusive visual switching effect; that is to say, not limited to three or even more new type B pictures.

The application can also be implemented to make special effects in an existing stream, at the moment of a brutal scene transition, the transition having been previously detected inside the stream.

The applications relate to all of those relative to the transmission of digital pictures and more specifically those who directly operate on the bit stream of compressed video pictures. These applications are intended for video servers.

What is claimed:

1. Compressed video data stream switching method for the transmission of a first data stream corresponding to a first video sequence, followed by, in a given switching point of this first stream, a second data stream corresponding to a second video sequence—each sequence being coded according to a GOP (Group of Pictures) structure—each GOP comprising intra type pictures coded in intra, predictive type pictures coded in inter and bidirectional type pictures coded in inter, the method comprising: modifying the second data stream prior to its transmission, by replacing bidirectional type pictures, pictures following the intra picture of the first GOP of the second sequence following the switching point, when one considers the coding order of the pictures, by bidirectional pictures, called commutation pictures, which have forward prediction and backward prediction modes that are predefined by attributing to their blocks a null motion vector, a null residue and a weighting rate relative to the predictions regarding one or several reference pictures that is related to the temporal location of the commutation pictures in relation to the reference picture and is also related to the position of the blocks in the picture.

2. Method according to claim 1, wherein the stream is an MPEG stream and the picture block is a macroblock or a sub-partition of a macroblock.

3. Method according to claim 2, wherein the forward or backward vector is defined by an index relative to the reference pictures, attributed to the macroblock or sub-partition.

4. Method according to claim 1, wherein the number of blocks in a backward prediction commutation picture increases from one picture to another when the temporal location of the picture in question gets closer to the following reference picture.

5. Method according to claim 1, wherein the picture blocks are weighted with regard to the predictions relative to the reference pictures and wherein the weighting rate is related to the temporal location of the commutation picture in relation to the reference pictures.

6. Method according to claim 5, wherein the weighting rates are predetermined per slice of macroblocks and wherein the picture is divided into slices according to the positions of the macroblocks for which the same weighting rates are chosen.

7. Method according to claim 6, wherein it exploits the FMO tool (Flexible Macroblock Ordering) to define the slices.

8. Method according to claim 1, wherein the position of a block for a forward or backward prediction is defined, for a picture, according to the following steps:
   attribution of a random number between 0 and 1 for each of the picture blocks,
   attribution of a threshold to each commutation picture, this threshold increasing when the picture in question temporarily moves towards the following reference picture,
   selection for a picture, of blocks of a number superior to the threshold attributed to the picture.

9. Method according to claim 1, wherein the Nb first macroblocks, according to a TV type scan, of a type B current picture, use a backward motion vector, Nb being defined by:

$$Nb = N_{MB} * \alpha * b$$

$N_{MB}$ being the number of macroblocks per picture
$\alpha = 1/M$, M being the period of the P pictures,
b being the index of position, 1, 2, 3, . . . , of the current B type picture in the interval of the I or P prediction pictures, with $0 < b < M$.

* * * * *